L. McWATTERS.
CORN PLANTER.
APPLICATION FILED OCT. 13, 1913.
1,126,647.
Patented Jan. 26, 1915.
3 SHEETS—SHEET 1.
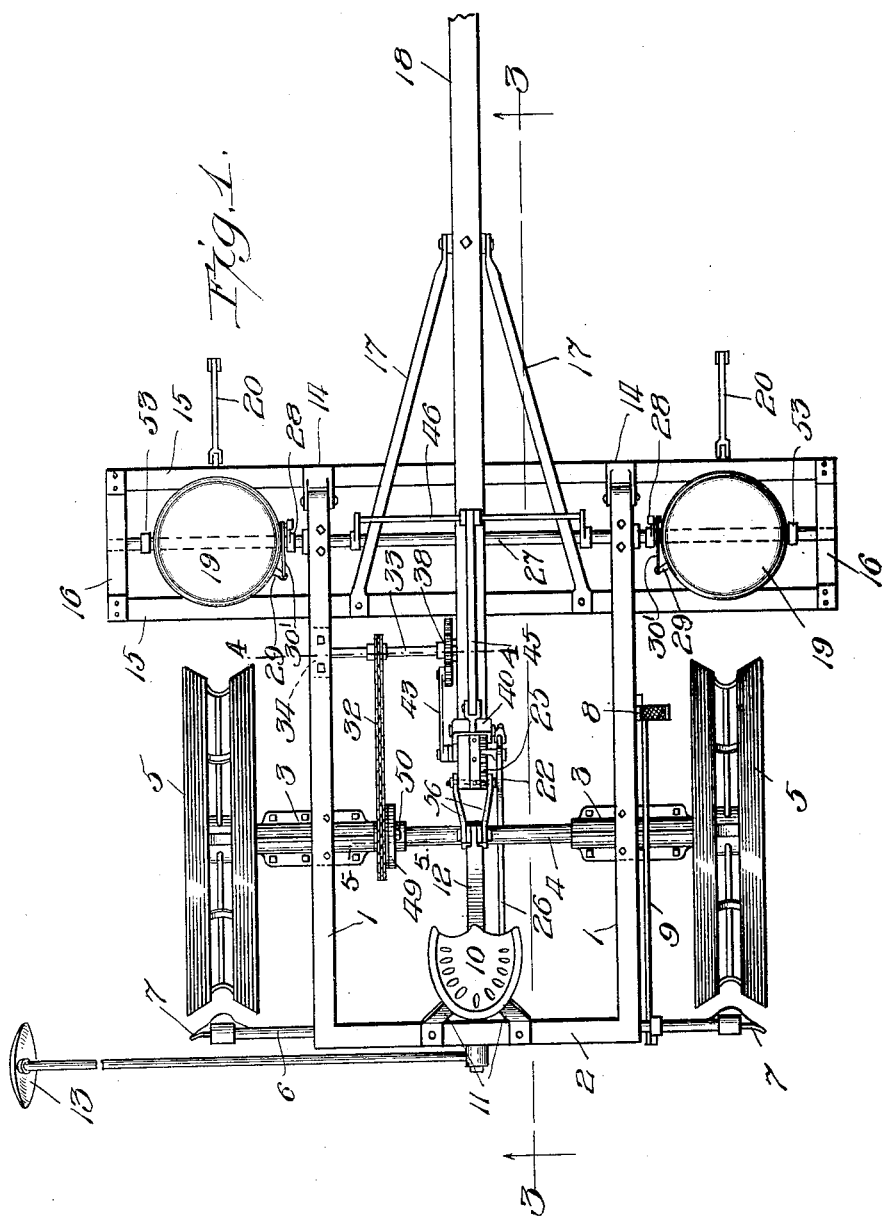
Witnesses:
Harry S. Gaither
William Chiston
Inventor,
Lutu McWatters
by Wilfred C. Lane.
Atty

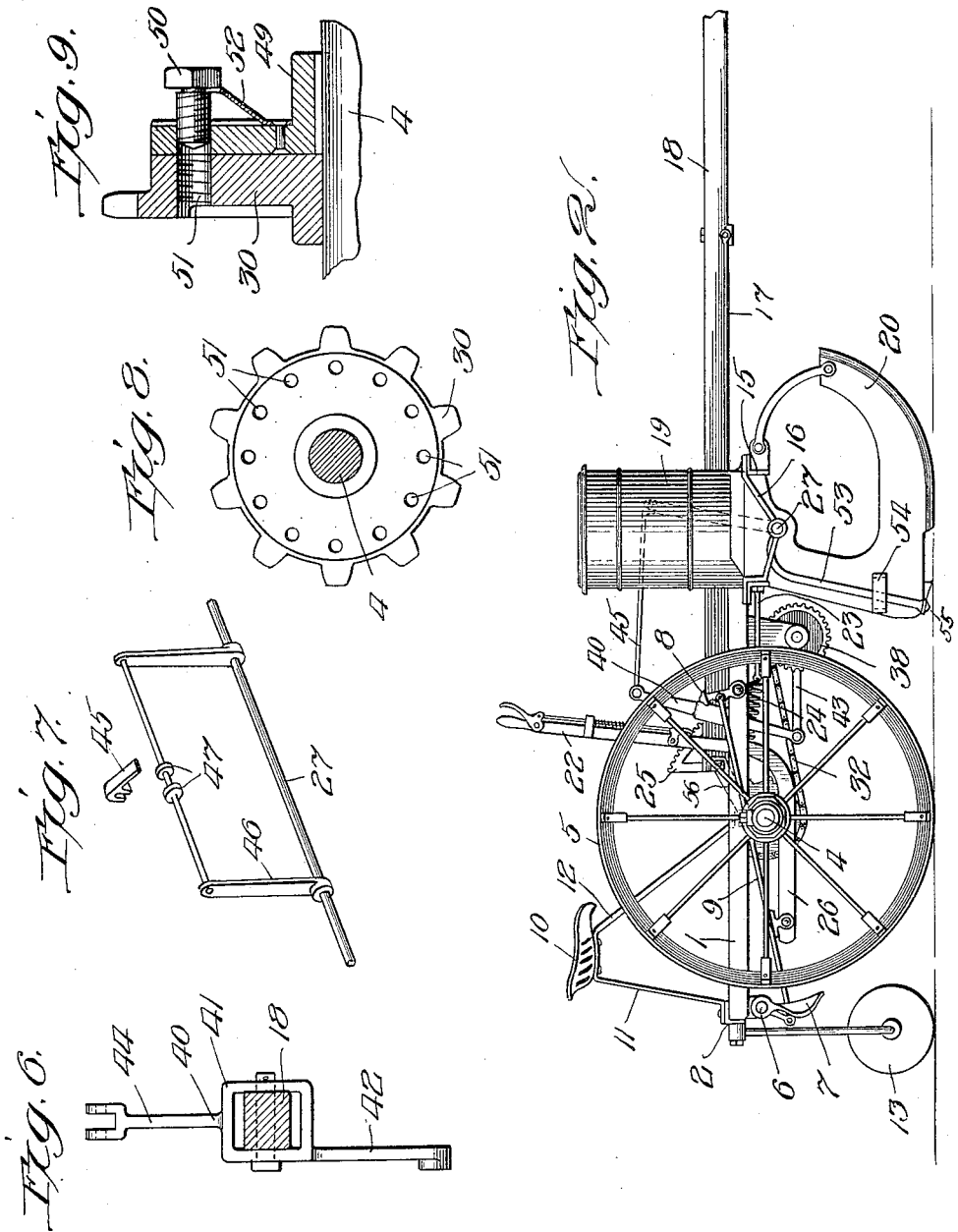

L. McWATTERS.
CORN PLANTER.
APPLICATION FILED OCT. 13, 1913.
1,126,647.
Patented Jan. 26, 1915.
3 SHEETS—SHEET 3.
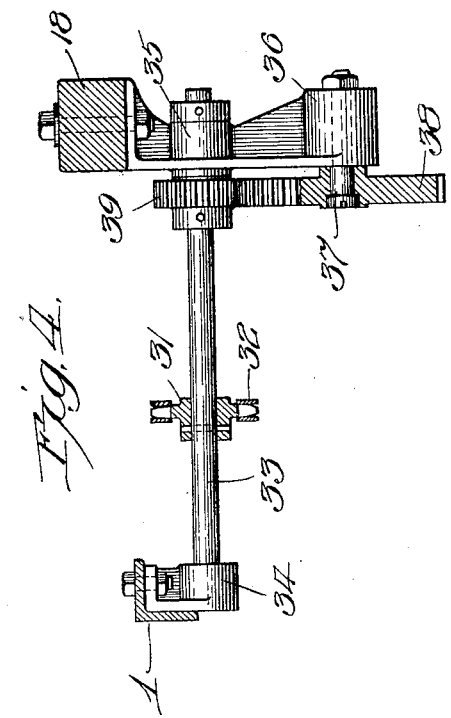
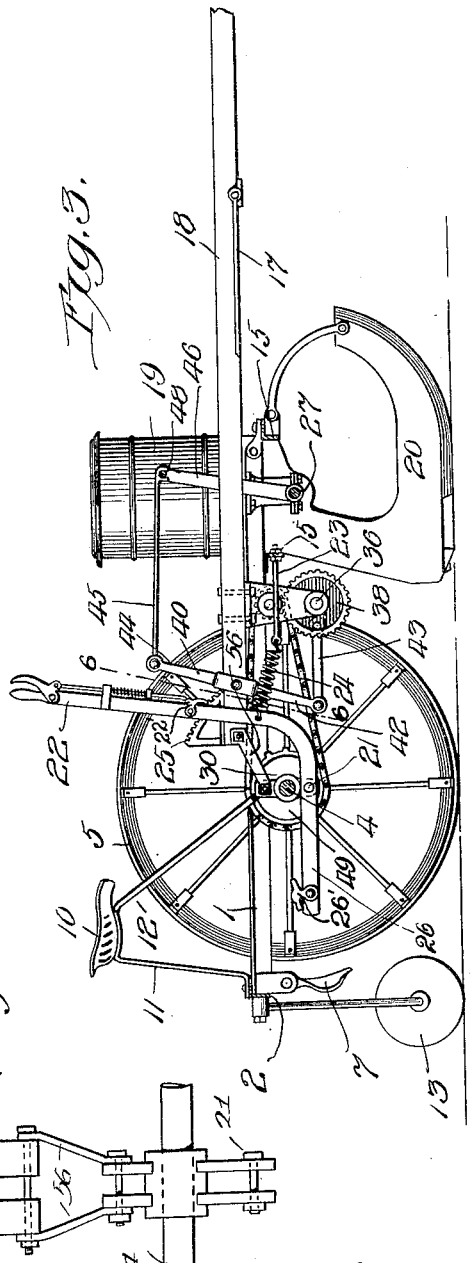
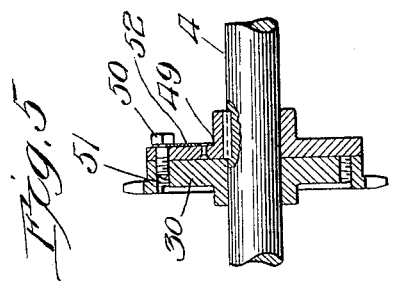
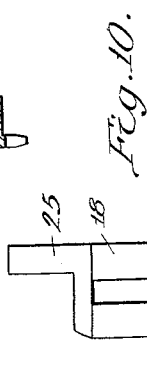
Witnesses,
Harry S. Gaither
William E. Linton
Inventor;
Lula McWatters
by Wilfred C. Lane
Atty

UNITED STATES PATENT OFFICE.

LULU McWATTERS, OF GILMAN, IOWA.

CORN-PLANTER.

1,126,647.  Specification of Letters Patent.  Patented Jan. 26, 1915.

Application filed October 13, 1913. Serial No. 794,763.

*To all whom it may concern:*

Be it known that I, LULU McWATTERS, a citizen of the United States, residing at Gilman, in the county of Marshall and State of Iowa, have invented new and useful Improvements in Corn-Planters, of which the following is a specification.

The present invention relates to improvements in corn planters and more particularly to gearing for operating the corn dropping mechanism.

Heretofore it has been common to stretch a wire across a field when planting corn having means for operating the corn dropping mechanism so that the corn will be dropped at intervals in forming the hills.

It is the purpose of the present invention to eliminate the use of a guide wire and provide a gearing for corn planters of this character with means whereby the corn dropping mechanism may be automatically operated at intervals.

Another object of the present invention is to provide an improved corn planter of the character aforesaid which may be readily thrown into and out of gear at the will of the operator and having comparatively few parts, thereby reducing the cost of manufacture and at the same time producing a strong, durable and efficient machine.

With the above and other objects in view, the invention consists of the novel features of construction, combination, formation and arrangement of parts as will be hereinafter more fully described and particularly pointed out in the appended claims.

In the accompanying drawings Figure 1 is a plan view of a corn planter embodying my invention. Fig. 2 is a side elevation of the same. Fig. 3 is a vertical longitudinal section taken on the line 3—3 of Fig. 1 in the direction of the arrows as shown. Fig. 4 is a detail vertical sectional view on the line 4—4, Fig. 1. Fig. 5 is a detail vertical sectional view of the means for connecting the corn dropping mechanism to the axle of the corn planter taken on the line 5—5, Fig. 1. Fig. 6 is a detail sectional view taken on the line 6—6, Fig. 3. Fig. 7 is a detail perspective view of the connection between the pitman and the operating shaft of the seed dropping mechanism. Fig. 8 is a side elevation of a gear mounted upon the supporting shaft of the corn planter, and Fig. 9 is a detail sectional view of the clutch mechanism for connecting the sprocket wheel with the drive shaft. Fig. 10 is a view partly in transverse vertical section of the rear end of the tongue and showing the connection between the tongue and axle.

Referring more particularly to the drawings, wherein like and corresponding parts are designated by similar reference characters through the several views, the numeral 1 indicates the main frame of the corn planter comprising a pair of parallel side bars having at their rear ends a transverse connecting bar 2 and the said bars are preferably made of angle iron as shown. Mounted in bearings 3 carried by the side bars of the main frame is an axle 4 having keyed to the extremities thereof, the supporting wheels 5.

Mounted in bearings upon the cross bar 2 is a shaft 6 having secured thereto scraper blades 7 for engaging the peripheries of the wheels 5 for cleaning the same in the usual manner. Pivotally mounted upon one of the side bars of the main frame 1 is a foot treadle 8 being connected to the shaft 6 by means of a rod 9 whereby the operator may readily throw the scraper into and out of contact with the wheels 5. Carried by the main frame is an operator's seat 10 being supported by a pair of diagonal braces 11 which are connected to the cross bar 2 and a brace 12 which is connected to the main axle 4 as shown.

A marker 13 is pivotally mounted on the rear bar 2 of the main frame which is adapted to mark the next adjacent row in which the corn is to be planted in the usual manner.

The forward extremities of the side bars of the main frame are pivotally connected as at 14 to an auxiliary or seed hopper supported frame. This auxiliary frame comprises a pair of parallel bars 15 which are connected by transverse braces 16, all of which are preferably made of angle iron as shown. Brace rods 17 pivotally connect the tongue 18 to the rear bar 15 of the auxiliary frame, thereby providing means for bracing the auxiliary frame. A pair of corn hoppers 19 are mounted upon the upper face of the bars 15 of the auxiliary frame and are provided with suitable corn dropping mechanism which may be of any preferred or well known construction and secured to the lower face of the cross bars 15 are the usual runners 20 which open the furrows as is common with corn planters of this character. To provide means for raising and lowering the auxiliary frame to throw the runners into and out of engagement with the ground, I mount upon the axle or shaft 4 a bracket having pivotally connected thereto as at 21, an operating lever 22. A rod 23 is pivotally connected at one end to the lever 22 and its opposite end is connected to the rear cross bar 15 of the auxiliary frame by means of a coil spring 24. The lever 22 is provided with a spring actuated pawl 22' as shown, which is adapted to engage a segmental rack 25 carried by the upper face of the tongue 18 for holding the lever in its adjusted position. Extending rearwardly from the lever 22 is an angular portion 26 having mounted thereupon foot treadles 26' thereby providing means for assisting the operation of the lever 22. It is obvious from the foregoing that upon releasing the pawl 22' carried by lever 22 and pulling rearwardly upon the same, the tension of the spring 24 will be increased and thereby raise the runners 20 out of engagement with the ground and when the lever is forced forward, the runners will be permitted to lower by their own weight and thereby engage the ground in which the corn is to be dropped.

A shaft 27 is journaled in bearings carried by the cross pieces 16 of the auxiliary frame and has keyed thereto a pair of cranks 28 which are pivotally connected to operating levers 29 of the corn dropping mechanism by means of links 30'. By the oscillation of the arms 29 of the corn dropping mechanism, the latter will be operated, thereby causing the corn to drop at predetermined intervals in the furrows formed within the ground. The corn dropping mechanism mounted within the hopper 19 is not shown as it is common in the art and therefore no detailed explanation is thought necessary.

To provide means for oscillating the shaft 27 so that the arm 29 will be oscillated, I mount upon the corn planter frame, a suitable gearing which is connected to the axle or driving shaft 4 as will be hereinafter fully described. This time gearing for oscillating the shaft 27 comprises a gear wheel 30 which is loosely mounted upon the driving shaft 4 and is connected to a sprocket wheel 31 by means of a sprocket chain 32. This sprocket wheel 31 is keyed upon a transversely extending shaft 33, the latter of which being mounted at one end within a bearing 34 carried by one of the side members of the main frame 1 and its opposite end in a bearing 35 depending from the lower face of the tongue 18, as is more clearly shown in Fig. 4 of the drawing. This bearing 35 is formed from a casting having also made integral therewith a bearing 36 which is below the bearing 35 and having journaled therein a shaft 37 carrying a gear wheel 38. Keyed upon the shaft 33 is a pinion 39 which is in mesh with the gear 38 whereby upon the rotation of the shaft 33 the gear wheel 38 will also be rotated. Pivotally mounted upon the tongue 18 and at the rear of the bearings 35 and 36 carried by the tongue is a lever 40. This lever 40 comprises a boxing 41 which encircles the tongue 18 and has depending therefrom an arm 42. This arm 42 is connected to one end of a rod 43 and the said rod having its other end eccentrically connected to the outer face of the gear 38. From this connection it is obvious that upon the rotation of the gear 38 the lever 40 will be oscillated. Extending from the upper end of the boxing 41 is an arm 44 having pivotally connected thereto a pitman 45. A yoke bracket is carried by the shaft 27 and has mounted upon its transverse bar adjacent the medial portion thereof, a pair of spaced shoulders 47 between which is adapted to rest the forked end of the pitman 45. It will be seen from the foregoing that upon the oscillation of the lever 40, the pitman 45 will also be oscillated, thereby transmitting an oscillatory movement to the shaft 27.

For connecting the sprocket wheel 30 to the drive shaft 4 I provide a suitable clutch as follows. Keyed upon the shaft 4 is a disk 49 having mounted therein a bolt 50. The sprocket wheel 30 is provided with a plurality of recesses 51 formed in one face thereof in which is adapted to rest the bolt 50 when connecting the sprocket wheel to the disks 49. A leaf spring 52 is also carried by the disk 49 having an outer bifurcated end which encircles the shank of the bolt 50 for normally holding the bolt out of engagement with the sprocket wheel 30 when the same is disconnected. When it is desired to operate the corn dropping mechanism, the bolt 50 is placed within one of the recesses 51 thereby forming a connection between shaft 4 and the sprocket wheel 30 which results in the operation of the corn dropping mechanism through the gearing as described upon the propulsion of the corn planter over the field. When it is desired to stop the operation of the corn dropping mechanism, in the case of emergency, the operator may lift the pitman 45 and hold the same out of engagement with the yoke 46 carried by the shaft 27 which results in the continuation of the operation of the gearing connected to the main drive shaft 4 but stops the oscillation of the shaft 27.

Keyed upon the shaft 27 adjacent each end thereof is a lever 53 which oscillates within a guide 54 carried by the runners 20. The lower ends of these levers 53 each carry a marker 55 which makes an indenture within the ground adjacent to the place where corn is dropped so that the hills will be marked upon the field, and the tongue 18 is connected with the axle by means of the braces 56.

In the accompanying drawings, I have shown the simple and preferred form of my invention, it being understood, however, that no limitation is necessarily made to the precise structural details therein exhibited, but the right is reserved to make any changes, alterations or modifications that come within the scope of the invention without departing from the spirit thereof or sacrificing the efficiency of the same.

I claim:—

1. In a corn planter, the combination of a main frame, a wheeled axle carried thereby, an auxiliary frame connected to the main frame, corn dropping mechanism carried by the auxiliary frame, a tongue connected to each of said frames, a lever pivotally mounted upon said tongue, means operatively connecting one end of said lever to the axle, a pitman pivotally connected to the opposite end of the said lever and means for detachably connecting the opposite ends of said pitman to the corn dropping mechanism.

2. In a corn planter, the combination of a main frame, a wheeled axle carried thereby, an auxiliary frame, corn dropping mechanism carried by said auxiliary frame, a tongue connected to said frames, a lever pivotally mounted upon said tongue, a gear wheel journaled upon said tongue, a link connected at one end of said lever and having its opposite end eccentrically mounted upon said gear wheel, means operatively connecting said gear wheel with the axle, and means for operatively connecting the lever with the corn dropping mechanism.

3. In a planter, the combination of a main frame, of a wheeled axle journaled therein, an auxiliary frame, corn dropping mechanism carried by said auxiliary frame, a shaft journaled within said auxiliary frame and operatively connected to said corn dropping mechanism, a yoke carried by said shaft, a tongue connected to said frames, a lever pivotally mounted upon said tongue, a pitman pivotally connected at one end to said lever, the opposite end of said pitman being forked and adapted to be detachably secured to said yoke, means for operatively connecting the opposite end of said lever with the axle, and a clutch interposed in the last said means.

4. In a corn planter, the combination of a main frame, a wheeled axle carried thereby, an auxiliary frame, corn dropping mechanism carried by said frame, a tongue connected to said frames, a lever pivotally mounted upon said tongue, a gear wheel journaled upon said tongue, a link connected at one end of said lever and having its opposite end eccentrically connected to said gear, means operatively connecting said gear wheel with the axle and a detachable connection between the lever and the corn dropping mechanism.

In witness whereof, I hereunto subscribe my name to this specification in the presence of two witnesses.

LULU McWATTERS

Witnesses:
A. E. WARD,
SOPHIA CHINDLUND.

Copies of this patent may be obtained for five cents each, by addressing the "Commissioner of Patents, Washington, D. C."